(12) United States Patent
Duch

(10) Patent No.: US 10,052,912 B2
(45) Date of Patent: Aug. 21, 2018

(54) HUB-BEARING ASSEMBLY FOR A VEHICLE WHEEL

(71) Applicant: Aktiebolaget SKF, Goteborg (SE)

(72) Inventor: Daniele Duch, San Gilio (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/791,444

(22) Filed: Oct. 24, 2017

(65) Prior Publication Data

US 2018/0126781 A1    May 10, 2018

(30) Foreign Application Priority Data

Oct. 24, 2016 (IT) .................. 102016000106430

(51) Int. Cl.
*F16C 33/76*      (2006.01)
*B60B 27/00*      (2006.01)
*F16C 33/78*      (2006.01)
*F16C 33/80*      (2006.01)
*F16C 19/16*      (2006.01)
*F16C 33/58*      (2006.01)
(Continued)

(52) U.S. Cl.
CPC ........ *B60B 27/0073* (2013.01); *F16C 19/163* (2013.01); *F16C 33/586* (2013.01); *F16C 33/7823* (2013.01); *F16C 33/7886* (2013.01); *F16C 33/80* (2013.01); *F16C 33/805* (2013.01); *F16C 19/14* (2013.01); *F16C 33/7876* (2013.01); *F16C 33/7896* (2013.01); *F16C 43/045* (2013.01); *F16C 2326/02* (2013.01)

(58) Field of Classification Search
CPC ................ F16C 33/7886; F16C 33/805; F16C 2326/02; B60B 27/0073
See application file for complete search history.

(56) References Cited

U.S. PATENT DOCUMENTS 4,402,558 A * 9/1983 Olschewski ........ B60B 27/0005
                                                              384/469
4,408,809 A * 10/1983 Walter ................ B60B 27/0005
                                                              384/486
(Continued)

FOREIGN PATENT DOCUMENTS

EP     1770296 A1   4/2007
EP     3015728 A1   5/2016
(Continued)

*Primary Examiner* — Phillip A Johnson
(74) *Attorney, Agent, or Firm* — Bryan Pecjian; SKF USA Inc. Patent Dept.

(57) ABSTRACT

A hub-bearing assembly having an axis of rotation and provided with a bearing outer ring and a bearing inner ring that define between them an interspace. The outer ring having a shaped groove and the inner ring being provided with a flange that is transverse to the axis of rotation; a sealing device, which is interposed between the outer ring and the inner ring to prevent the entry of impurities into the hub-bearing assembly through the interspace, being provided with a protective cover mounted on the flange to rotate with the inner ring, and extends around the outer ring to close off the interspace from the exterior of the interspace, and has a free terminal edge arranged to snap into the shaped groove to define an annular outlet that is placed inside the shaped groove.

7 Claims, 1 Drawing Sheet

(51) Int. Cl.
    *F16C 43/04*     (2006.01)
    *F16C 19/14*     (2006.01)

(56) References Cited

U.S. PATENT DOCUMENTS

| | | | | |
|---|---|---|---|---|
| 4,545,692 A | * | 10/1985 | Bras | B60B 27/0005 |
| | | | | 384/477 |
| 4,647,230 A | * | 3/1987 | Friedrich | F16C 19/185 |
| | | | | 384/486 |
| 8,523,447 B2 | * | 9/2013 | Langer | B60B 27/0005 |
| | | | | 384/477 |
| 2011/0148182 A1 | * | 6/2011 | Walter | F16C 33/805 |
| | | | | 301/105.1 |

FOREIGN PATENT DOCUMENTS

| | | | |
|---|---|---|---|
| GB | 2072767 | A | 10/1981 |
| JP | S541801 | U | 1/1979 |
| JP | S6210103 | U | 1/1987 |

* cited by examiner

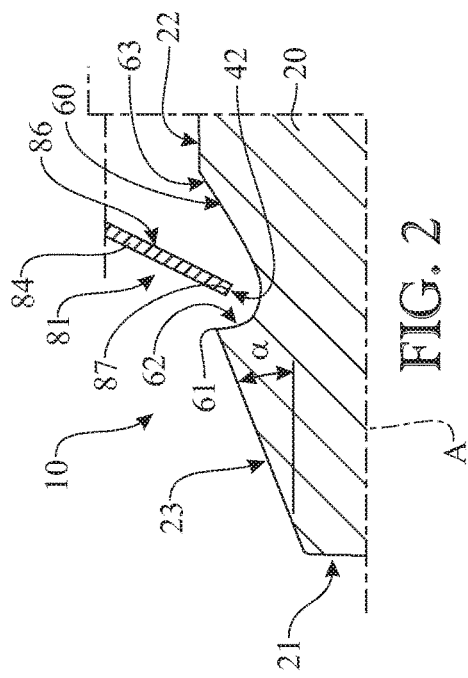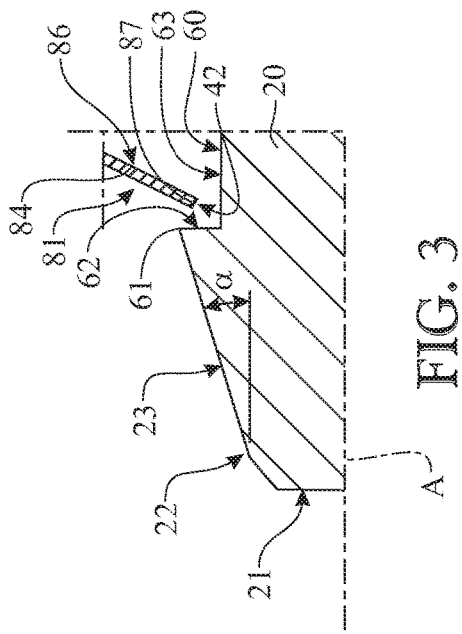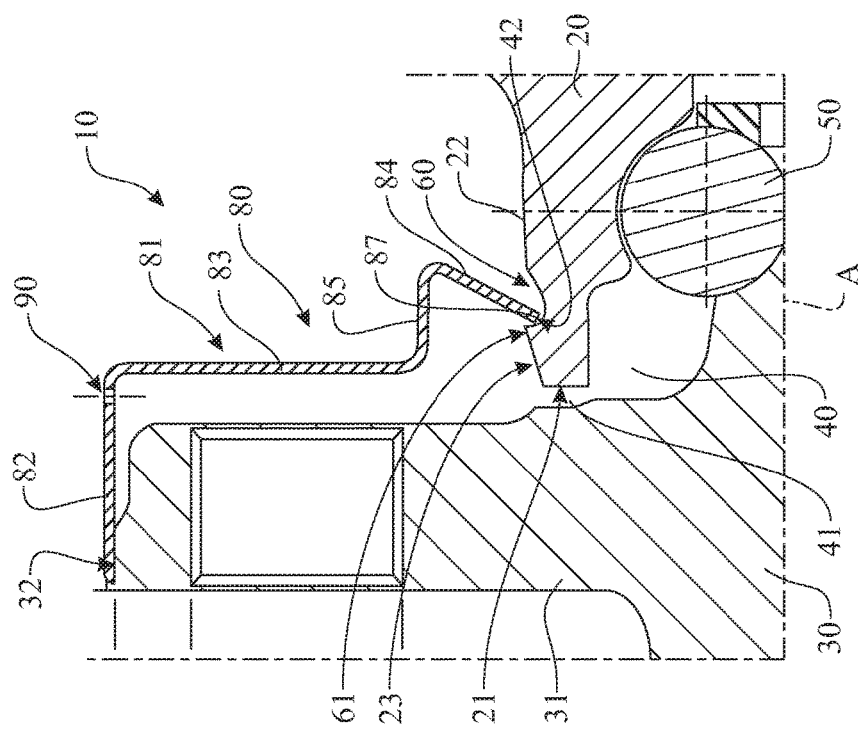

HUB-BEARING ASSEMBLY FOR A VEHICLE WHEEL

CROSS-REFERENCE

This application claims priority to Italian patent application no. 102016000106430 filed on Oct. 24, 2016, the contents of which are fully incorporated herein by reference.

TECHNOLOGICAL FIELD

The present invention relates to a hub-bearing assembly for a vehicle wheel.

BACKGROUND

Known hub-bearing assemblies have an axis of rotation and include a bearing outer ring delimited by a cylindrical outer surface that is coaxial with the axis of rotation and has a shaped groove formed through the cylindrical outer surface; a bearing inner ring that defines with the outer ring an interspace, and is provided with a flange that is transversal to the axis of rotation; and a sealing device, which is interposed between the outer ring and the inner ring to prevent the entry of any impurities into the hub-bearing assembly through the interspace, and comprises, in turn, a protective cover, which is mounted on the flange to rotate with the inner ring, and extends around the cylindrical outer surface of the outer ring to close off the interspace from the exterior of the interspace.

In hub-bearing assemblies of the type described above, the cover terminates in an annular outlet facing the outer ring at the shaped groove, and, in spite of this particular configuration of the cover and the interaction of the shaping of the shaped aperture with the position of the annular outlet, it has been found that, in very demanding conditions of use or when considerable amounts of impurities are present, the sealing action of the cover is not as reliable as expected, possibly because, in some cases, minor errors in the positioning of the cover have subsequently compromised the necessary combined effect of the positions of the annular outlet and the shaped groove.

SUMMARY

The object of the present invention is to provide a hub-bearing assembly for a vehicle wheel, which, while it has a limited weight in order to be marketable in a context of increasingly stringent regulations concerning $CO_2$ emissions, not only allows an increase in the sealing capacity, but also ensures the correct positioning of all components without the need for further checks during production, which usually have a retarding effect on cycle times and also increase production costs.

According to the present invention, a hub-bearing assembly is provided for a vehicle wheel, having the characteristics stated in the attached claims.

BRIEF DESCRIPTION OF THE DRAWINGS

The invention will now be described with reference to the attached drawings, which show a non-limiting example of its embodiment, in which:

FIG. 1 is a sectional view of a first preferred embodiment of a hub-bearing assembly for a vehicle wheel, produced according to the present innovation;

FIG. 2 is a sectional view, on an enlarged scale, of a detail of the hub and wheel assembly of FIG. 1; and FIG. 3 is a sectional view, on an enlarged scale, of a detail of a second preferred embodiment of the hub and wheel assembly of FIG. 1.

DETAILED DESCRIPTION

With reference to FIG. 1, the number 10 indicates the whole of a hub-bearing assembly having an axis A of rotation and comprising a bearing outer ring 20, a bearing inner ring 30 defining, with the outer ring 20, an interspace 40, and a plurality of rolling bodies 50 interposed between the outer ring 20 and the inner ring 30 to enable the outer ring 20 to rotate relative to the inner ring 30.

The inner ring 30 is provided with a flange 31 transversal to the axis A of rotation for the purpose of mounting a vehicle wheel (known and not illustrated) thereon, and is radially delimited towards the outside by a cylindrical fitting surface 32.

The outer ring 20 can be coupled to a fixed element of the vehicle, for example a suspension strut, and is delimited by a front annular surface 21 which defines, with the flange 31, an inlet 41 of the interspace 40, and by an outer surface 22, which is distributed about the axis A of rotation and has a shaped groove 60 formed through the outer surface 22.

The groove 60, as also shown in FIG. 2, defines on the outer surface 22 a mounting surface 23, which is preferably inclined, starting from the annular surface 21, at an angle $\alpha$ to the axis A, this angle preferably being acute and being equal to 0 degrees or more, and which is axially delimited by the annular surface 21 on one side and by an engagement edge 61 of the shaped groove 60 on the axially opposed side. In particular, the shaped groove 60 has two ramps 62 and 63 which have inclinations differing from one another relative to the axis A of rotation and which are joined to one another on the bottom of the groove 60, the ramp 62 having a greater inclination than the ramp 63 and being radially delimited towards the outside by the edge 61.

As described above, the hub-bearing assembly 10 can be interposed between a fixed element of the vehicle, for example a suspension strut, and a wheel of the vehicle, and must therefore operate in an environment which is highly contaminated by the presence of both liquids and dust: in order to maintain the technical characteristics and the correct operation of the hub-bearing assembly 10, the latter comprises a sealing device 80, which is interposed between the outer ring 20 and the inner ring 30 to prevent the entry of any impurities into the hub-bearing assembly 10 through the interspace 40, and comprises, in turn, a protective cover 81, which is mounted on the flange 31 to rotate with the inner ring 30, and extends around the outer surface 22 of the outer ring 20 to close off the interspace 40 from the exterior of the interspace 40, that is to say from the exterior of the hub-bearing assembly 10.

The protective cover 81 comprises a cylindrical wall 82 fitted on to the cylindrical fitting surface 32 of the flange 31, a lateral wall 83 transversal to the axis A of rotation and axially facing the flange 31, and a terminal wall 84 which is inclined relative to the axis A of rotation and is directed towards the shaped groove 60. The wall 82 and the lateral wall 83 are transversal and integral with one another, while the terminal wall 84 is integral with the lateral wall 83 with the interposition of a further cylindrical wall 85, which extends coaxially with the axis A and transversely from the lateral wall 83 away from the flange 31. The cylindrical wall 85 is an optional wall, since the terminal wall 84 could extend towards the outer surface 22 directly from the lateral wall 83, but it enables the axial position of the terminal wall 84 to be independent of the axial dimensions of the wall 82, making the design of the protective cover 81 more flexible.

On the side opposite the flange 31, the terminal wall 84 has an outer protective surface 86 having an opposite inclination to the inclination of the ramp 62, and is delimited radially towards the inside by a free terminal edge 87, which is positioned in the shaped groove 60 at the position of the ramp 62 and defines, with the ramp 62, an annular outlet 42 connected to the interspace 40.

The shape and dimensions of the annular outlet 42, the inclination of the outer protective surface 86, the inclination of the ramp 62 considered on its own and relative to the inclination of the surface 86, and the positioning of the annular outlet 42 inside the shaped groove 60 are all characteristics which jointly define the sealing capacity of the sealing device 80: in particular, the opposed inclinations of the ramp 62 and the surface 86 make it particularly difficult for contaminants to enter and rise through the annular outlet 42, while the similar inclinations of the ramp 63 and the surface 86 tend to reduce progressively a space in front of the outlet 42, thus creating, in combination with the rotation of the wall 84, turbulent motion in the contaminants, especially those of a liquid nature, which appear at the outlet 42 during the use of the hub-bearing assembly 10. Owing to the positioning of the annular outlet 42 inside the groove 60 and in the proximity of the ramp 62, the outlet 42 acts as a true labyrinth seal.

Furthermore, in the unlikely event that liquid contaminants still succeed in penetrating into the interspace 40, the shaped groove 60 acts as a gutter and promotes the outflow of these contaminants back towards the outside of the interspace 40, and is assisted in this outflow operation by a plurality of holes 90 which are formed through the cylindrical wall 82 substantially in the proximity of the lateral wall 83, and which are distributed uniformly about the axis A.

It follows from what has been said that the hub-bearing assembly 10 for a vehicle wheel described above has excellent characteristics of sealing and protection from external contaminants, and provides a set of arrangements such that high efficiency can be achieved in terms of sealing and protection of the hub-bearing assembly 10 and its rolling bodies 50.

Additionally, in order to provide this high efficiency in terms of sealing and protection of the hub-bearing assembly 10, the free terminal edge 87 has a diameter which is smaller than an inside diameter of the engagement edge 61 of the shaped groove 60, and the free terminal edge 87 is therefore snap-fitted into the shaped groove 60 during the assembly of the hub-bearing assembly 10. In particular, the axial movement of the outer ring 20 and the inner ring 30, with the cover 81 which has been fitted on to the flange 31, causes the free terminal edge 87 to engage with the mounting surface 23 and also causes the free terminal edge 87 to slide progressively on the surface 23 until it passes over the engagement edge 61. This type of mounting, which is additionally facilitated by the configuration of the cover 81 which makes the terminal wall 84 free to bend and the terminal edge 87 free to follow the mounting surface 23 precisely, always provides correct positioning of the free terminal edge 87 within the shaped groove 60, in other words correct positioning of the annular outlet 42 in a position close to the ramp 62 of the groove 60. The presence of the engagement edge 61 and its interaction with the terminal edge 87 is one of the essential characteristics of the present invention, as is the closeness of the free terminal edge 87 to the ramp 62, although the shape of the latter is not limited to what has been described and illustrated in FIG. 2, but, preferably, may also be configured as shown alternatively in FIG. 3, where the ramp 62 of the groove 60 is formed by a surface transversal to the axis A, while the ramp 63 is totally absent and entirely incorporated into the surface 22, or alternatively is formed by a conical surface substantially orthogonal to the ramp 62, which progressively merges into the surface 22.

In addition to the embodiments of the invention as described above, it is to be understood that there are numerous other variants. It is also to be understood that said embodiments are solely exemplary and do not limit the scope of the invention, its applications, or its possible configurations. On the contrary, although the above description enables those skilled in the art to apply the present invention in at least one exemplary configuration, it is to be understood that numerous variations of the described components may be devised, without thereby departing from the scope of the invention as defined in the appended claims, interpreted literally and/or according to their legal equivalents

What is claimed is:

1. A hub-bearing assembly having an axis of rotation and comprising:
    a bearing outer ring delimited by an outer surface distributed around the axis of rotation and has a shaped groove formed through the outer surface;
    a bearing inner ring that defines with the outer ring an interspace, and is provided with a flange transverse to the axis of rotation;
    a sealing device, which is interposed between the outer ring and the inner ring to prevent the entry of impurities in the hub-bearing assembly through the interspace, and provides a protective cover, which is mounted on the flange to rotate with the inner ring, and extends around the outer surface of the outer ring for bordering the interspace from outside the interspace; wherein
    the protective cover comprises a free terminal edge that is arranged to snap into the shaped groove and defines an annular outlet that is placed inside the shaped groove.

2. The hub-bearing assembly according to claim 1, wherein the outer surface of the outer ring comprises a frontal surface transverse to the axis of rotation and a mounting surface that is contiguous to the frontal surface; the mounting surface and the shaped groove being separated by a fitting engagement edge of the shaped groove; the engagement edge presents a diameter whose size is greater than the size of an inner diameter of the free terminal edge.

3. The hub-bearing assembly according to claim 2, wherein the groove fitting has a first ramp and a second ramp of different inclinations with respect to each other relative to the axis of rotation; the first ramp being delimited by the engagement edge and the annular outlet being arranged in correspondence of the first ramp itself.

4. The hub-bearing assembly according to claim 3, wherein the first ramp has a greater inclination than the inclination of the second ramp.

5. The hub-bearing assembly according to claim 4, wherein the protective cover comprises an end wall that is bounded radially inwardly by the free terminal edge and is provided with a sheltering outer surface whose inclination is opposite to the inclination of the first ramp to prevent the entry of impurities in the hub-bearing assembly through the annular outlet.

6. The wheel hub bearing assembly according to claim 5, wherein the protective cover also comprises a side wall transverse to the axis of rotation and is axially facing the flange, and a first cylindrical wall, which is integral to the side wall and is fitted on the flange; the end wall being integral to the side wall through the interposition of a second cylindrical wall.

7. The hub-bearing assembly according to claim 3, wherein the first ramp is transverse to the axis of rotation.

* * * * *